Sept. 17, 1940.   D. TEATINI   2,214,978
DIFFUSION APPARATUS
Filed Jan. 22, 1938
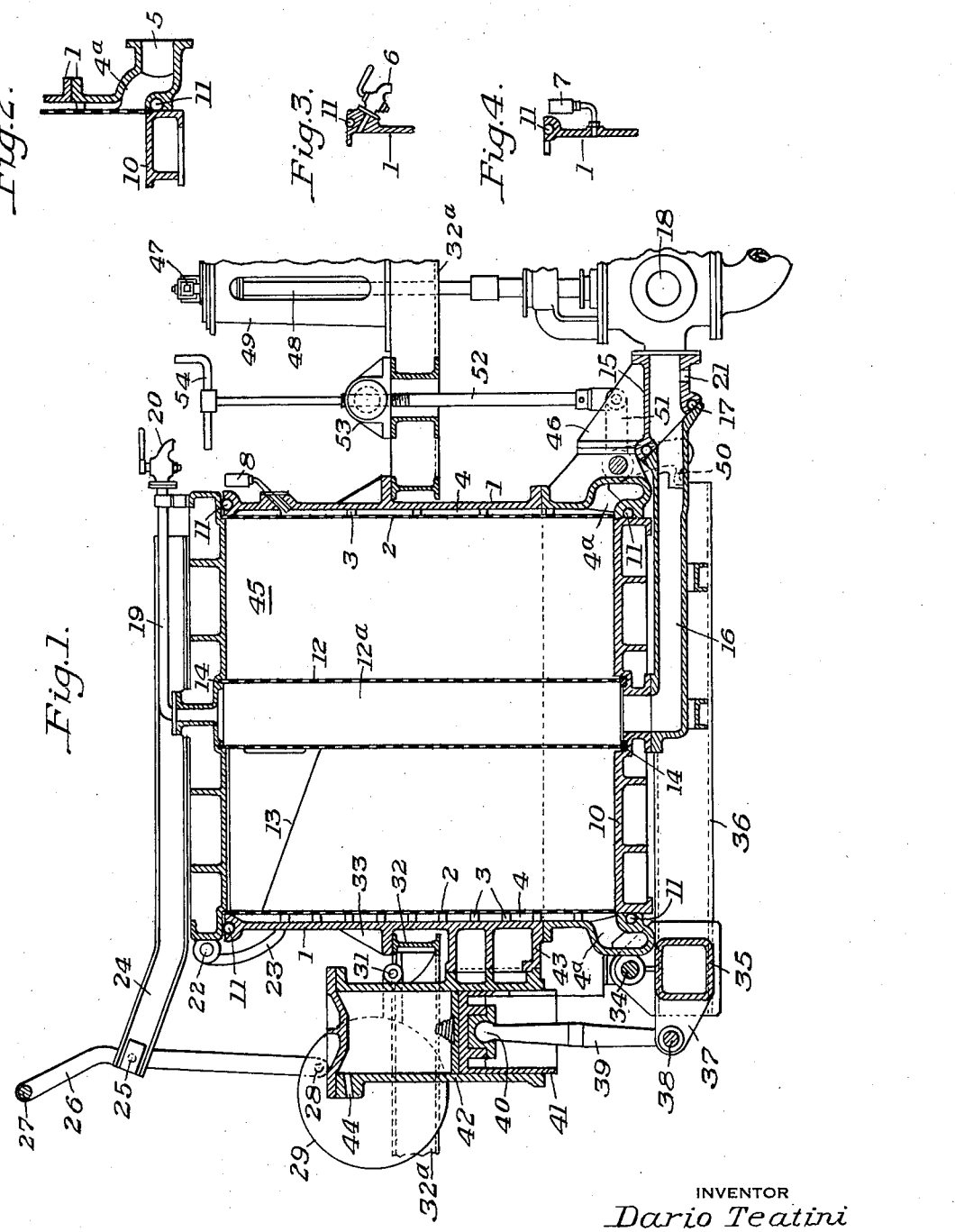
INVENTOR
*Dario Teatini*
BY Stebbins, Blenko & Parmelee
ATTORNEYS Patented Sept. 17, 1940

2,214,978

UNITED STATES PATENT OFFICE 2,214,978

DIFFUSION APPARATUS

Dario Teatini, Hougaerde, Belgium

Application January 22, 1938, Serial No. 186,455
In Great Britain January 25, 1937

5 Claims. (Cl. 127—19)

It is a well known fact that the extraction of sugar from beets is commonly effected at the present time by the so-called "diffusion process" which consists, after having cut the beets into slices or cossettes, in pouring the latter into diffusers where they come into contact with hot water. This produces the physical phenomenon known as osmosis or diffusion whereby the sugar-containing water comes out of the vegetable cells by passing through its cellular membranes while water containing no sugar replaces it in such cells. Since, for proper operation, it is important that the external or diffusing liquid should always have a specific gravity lower than that of the inter-cellular liquid, thorough diffusion is performed by causing pure water to flow first through those beet slices which are almost completely exhausted, then in turn through slices that are less and less exhausted and finally through new beet slices. This involves the use of a battery of diffusers (generally 14 to 16) wherein the diffuser which first receives the liquid contains the most exhausted slices and through which the stream of liquid flows successively. The liquid from one diffuser takes the sugar and flows (generally through a so-called "calorizer" or heater) to the next diffuser and so on. After having flowed through the last diffuser on the battery (which contains the new slices) the liquid flows to the measuring tank. Assuming the battery to have a capacity of 100 hectoliters per diffuser, the water must, before extracting sugar to the required extent, flow through a mass or column of beet slices which represents a total thickness of approximately 40 meters that is to say 2 to 3 meters for each diffuser in a battery of 14 diffusers working at the same time. This is one cause of difficulties in circulation of the liquid. Another difficulty is that in the diffuser which receives the new slices, the liquid must be first caused to flow in the reverse direction.

The principal disadvantages of diffusion processes hitherto employed may be summarized as follows:

(1) It is difficult for the liquid to flow properly through the very thick mass or column of beet slices contained in the several diffusers of the battery.

(2) It is difficult to cause the liquid to be well distributed through the mass of slices owing to the tendency of the liquid to take the line of least resistance.

(3) The exhaustion of the slices takes place unevenly owing to the unequal distribution of the liquid through the mass of slices.

(4) It is impossible to obtain a thorough percolation of the liquid through a mass of very thin slices while obviously the best sugar extraction would involve the cutting of the beets into very thin slices; the consequence of this is that the beets are usually cut into relatively large slices which necessitates a longer period of contact between the liquid and the slices; as a result of this, not only saccharose but objectionable mineral and organic non-sugars are extracted.

(5) The extraction of the sugar is also uneven on account of the different sizes of the slices, so that in order to extract sugar properly from large slices, it is necessary to "over-exhaust" the smaller slices and consequently to extract from them an excess of non-sugars.

(6) The circulating liquid must be heated to a relatively high temperature and this extracts from the slices a large proportion of pectic substances, waxes, etc. which are noxious or undesirable for the subsequent treatment of the sugar juice.

(7) It is impossible to avoid discharging into the pulp pit a very large volume of water which still has a certain content of sugar; this necessitates a large and expensive plant for separating and draining away the water from the said pulp and also for drying and agglomerating the latter and purifying the water.

(8) It is necessary to pass through the beet slices a large volume of fairly dilute juice so as to extract the maximum of sugar (115 to 140 kilograms of juice per 100 kilograms of fresh slices, while normally the beets only contain 95 kilograms of juice); this makes it necessary to evaporate off the excess of water and calls for large pumping, filtering and other plants.

The object of the present invention is generally to provide a new or improved diffusion method and apparatus obviating to an outstanding extent the aforesaid disadvantages.

More specifically, the objects of the invention are:

(a) To reduce the mass or column of beet slices through which the liquid must flow and thus to facilitate its circulation therethrough in spite of the tight settling of the slices;

(b) To distribute evenly the liquid that flows through the mass of slices so as to achieve substantially equal degrees of exhaustion in the several regions thereof;

(c) To permit the liquid to flow even through a mass of very finely divided and tightly settled slices so as to hasten the process of exhaustion and to make it more thorough without extracting an undue quantity of non-sugars;

(d) To render, if necessary, the operation of one element of the battery of diffusers independent of the general operation of the other elements;

(e) To make it possible to extract the sugar from the slices with substantial completeness without necessitating too high operating temperatures;

(f) To do away with draining waters from the diffusers and pulp presses and therefore to save the losses of sugar that they represent and the cost of purifying such water;

(g) To draw off from the diffusers a quantity of juice which may be as close as possible to that actually contained in the beets in the natural state whereby a minimum amount of water has to be evaporated off in the course of the juice concentration.

With these and such other objects in view as will incidentally appear hereafter, the invention comprises the novel sequence of operating steps which make up the improved method as well as the novel construction and combination of parts which constitute the improved apparatus which will be described with reference to the accompanying diagrammatic drawing showing the same by way of illustrative example and forming a part of the present disclosure.

Generally speaking, the method according to the invention for extracting a material (e. g., sugar) from a substance containing it (e. g., beets) by processes or treatments comprising osmosis, lixiviation and diffusion includes the steps of filling or charging an annular chamber (which may form a complete or a segmental annulus) bounded by inner and outer perforated walls defining ducts coextensive to said chamber with a settled and/or compressed mass of highly or very finely divided substance, and feeding a liquid under pressure to one of said ducts so as to cause said liquid to percolate throughout the full cross-sectional area of said mass to the other duct, said liquid forming a very large number of small veins or streamlets which at all levels of the mass of substance osmotically or lixivially take from it the material to be extracted.

More specifically, the method according to the invention includes the steps of filling an annular chamber bounded by concentric inner and outer finely perforated walls defining ducts coextensive to the length or height of said chamber with a tightly settled mass of the highly divided substance (for example very fine beet slices or cossettes), feeding a liquid under pressure (for example pure water or water coming from a preceding diffuser and already containing a certain percentage of sugar) to the inner duct so as to cause it to percolate radially in the outward direction throughout the full sectional area and at all levels of said mass simultaneously and evenly to the outer duct, then cutting off the supply of incoming liquid, connecting one of the ducts (advantageously the inner duct) to means capable of altering the pressure prevailing in said mass so as to expel from it the residual liquid, and finally discharging the mass of substance out of said chamber.

For expelling the residual liquid, one of the ducts may be connected either to a source of compressed fluid such as air or steam or else to a source of depression or vacuum, as the case may be.

In the drawing:

Figure 1 is an axial sectional view of the entire apparatus or diffuser and certain accessory contrivances associated with it.

Figure 2 is a fragmentary sectional view showing the union between the casing of the apparatus or diffuser and the outlet pipe for the liquid or sugar-containing juice.

Figure 3 is a fragmentary view showing a valve or cock associated with the vent provided on the outer duct of the apparatus.

Figure 4 is a fragmentary view showing a pressure gauge communicating with the inside of the apparatus casing.

Like reference numerals designate like parts throughout the several views.

As illustrated, the apparatus comprises a cylindrical water-tight casing 1 which, in the embodiment shown, stands vertically and which surrounds a perforated, openwork, apertured or foraminous enclosure 2 constituted for example by an apertured metal sheet or by a strong gauze of appropriate mesh size. The enclosure 2 is held at the proper interval from the inner surface of the casing 1 by distance pieces or blocks 3. The lower end of the space or duct 4 defined between the casing 1 and the enclosure 2 is so bulged as to form an annular channel 4a whence an outlet pipe 5 (see Fig. 2) leads outwardly. The juice formed by the liquid that has percolated through the finely divided substance which is tightly settled or compressed inside the enclosure 2 and that has been enriched by osmosis, lixiviation or diffusion through said substance flows away through the outlet pipe 5. The air imprisoned in the annular space or duct 4 escapes at its upper end through a vent controlled by a valve or cock 6 (see Fig. 3). The pressure prevailing in the duct 4 is indicated by a gauge 7 while the temperature in this duct is indicated by a thermometer 8. The gauge 7 and thermometer 8 may be of conventional form.

The casing 1 is closed at its upper end by a rockable door or cover plate 9 which is pivotally supported by a hinge 22 supported by a strengthening bracket 23 carried by the frame or casing. The door 9 is provided with a lever 24 pivotally connected at 25 to a companion lever 26 fitted at its top end with a handle 27. The lever 26 is pivotally connected at 28 at its bottom end to a counterweight 29 guided by a link 30 pivoted at 31 on a girder 32 forming part of a skeleton framework 32a and carrying a gusset plate 33 supporting the casing 1. The arrangement is such that the counterweight moves along an arc whose centre is constituted by the pivot 31. In Fig. 1, the counterweight 29 occupies its upper position for which the door 9 is applied on the brink of the casing 1 and closes it. The door 9 may be pivotally lifted off the brink of the casing 1 for pouring or charging the substance to be treated, as will be described hereafter.

The casing 1 is closed at its lower end by a rockable door or cover plate 10 which is pivotally supported by a hinge 34 supported by a hollow girder 35 forming part of the base 36 of the apparatus. The hinge 34 is connected to a link 37 connected in turn by a pivot 38 to a rod 39 operated through a ball and socket joint 40 from a piston 41 in a cylinder 42 carried by a bracket 43 extending sidewise from the casing 1. The cylinder 42 has a port 44 which may be connected to a suitable source of pressure fluid by a two-way valve (not shown) whereby such fluid may be admitted through said port into the cylinder 42 for pushing out the piston 41 and closing up the door 10, or, alternatively, let off for allowing the return motion of the piston 41 to permit the door 10 to be opened down for discharging the exhausted substance from its chamber in the casing 1, as will be hereafter set forth.

The rockable doors or cover plates 9 and 10 are rendered water-tight relatively to the casing 1 by hydraulic seals 11 provided in thickened portions of the upper and lower edges of said casing 1, as shown in Fig. 1.

Along the axis of the apparatus is arranged an openwork, apertured, perforated or foraminous cylindrical wall 12 (made for example of an apertured metal sheet or a strong gauze) which bounds a central core-like cylindrical duct 12a. Such wall 12 is properly held by radially extending partitions, struts or webs such as 13 which may be solid or apertured and which may extend over any suitable portion of the height of the inside of the casing. The extremities of the central core-like duct 12a bear against the cover plates or doors 9, 10 by means of annular resilient gaskets 14 fitted in appropriate recesses formed in the inner faces of such doors.

The concentric ducts 4 and 12a which are coextensive to the casing 1 since their generatrices are all substantially equal define an intermediate annular chamber 45 the capacity of which is considerably larger than that of said ducts. The purpose of this chamber 45 is to receive the mass of highly divided substance, such for instance as very finely divided or sliced beets in the case of sugar diffusion, and to allow such highly divided substance to become settled or compressed.

The lower end of the central duct 12a is connected to an inlet pipe section 16 carried by the lower door 10 and connected in turn to a stationary pipe section 15 forming an extension and carried by the frame 46 which supports the casing 1. The inlet pipe sections 15 and 16 are interconnected by a water-tight union 17 comprising a hydraulic seal and so formed as to permit the pipe section 16 to swing off the stationary pipe section 15 when the door 10 is rocked down into open position as above described or, alternatively, to swing back into registration with the pipe section 15 when the door is rocked up to closed position.

The outlet pipe 5 and the inlet pipe section 15 are connected to a multiple way valve generally designated by 18. Such valve 18 may be operated from a handle 47 through the medium of an upstanding stem 48 guided in an apertured upright 49 carried by the skeleton framework 32a.

Locking means are provided to prevent the lower door 10 from unduly rocking down if the fluid pressure ceases to exert its holding action on the piston 41 in the cylinder 42. Such locking means comprises a hook 50 operated through a link system 51 by an upstanding stem 52 held in a bracket 53 on the skeleton framework 32a. The stem 52 is fitted at its upper end with a handle 54.

The air imprisoned or trapped in the axial duct 12 escapes through a top tube 19 fitted with a cock or valve 20 and supported by the upper cover plate or door 9.

The liquid which still fills the axial duct 12 on completion of each operation is discharged through an opening 21 formed in the pipe 15 and normally closed by a valve or plug (not shown).

The operation of the diffuser is as follows: Assuming the annular space or chamber comprised between the perforated walls 2 and 12 to be filled up with a tightly settled and finely divided substance such as very small beet slices or cossettes and assuming, moreover, the doors or cover plates 9 and 10 of the casing 1 to be closed, the operator will suitably actuate the multiple way valve 18 to cause the diffusion liquid to be fed under pressure through the pipes 15, 16 and to flow up through the axial duct 12a while forcing out the air through the vent tube 19 and valve 20 which must now be opened. The liquid passes through the perforations in the wall 12, percolates through the mass of substance and reaches the annular space 4 while forcing the air which escapes through the valve 6. When all the available space if filled with liquid, the valves 6 and 20 are closed, so that the liquid under pressure which flows into the duct 12 can only reach the duct 4 and thence the outlet pipe 5 in which the prevailing pressure is smaller than in the duct 12 by percolating radially through the mass of substance. The difference between the higher pressure in the central duct 12 and the lower pressure in the outer duct 4 can be so adjusted that the speed at which the liquid percolates through the substance represents, for a given degree of settling or compression of this substance and for a given temperature thereof, the most favorable value for extracting as much useful matter (saccharose) and as little useless matter (non-sugars) as possible within industrially acceptable limits. The perforated wall 2 acts as a strainer which prevents the outflowing liquid from taking along with it the treated substance. The size of the apertures of the wall 2 must be so selected as to permit this straining action to take place even in case of highly divided beet slices or cossettes.

The duct 12a which brings the liquid through the mass of substance may have such proportions as to compensate for difference of hydrostatic pressure from the inlet to the region of the enclosure which is the most remote from said inlet.

Where, as in the present embodiment, the circulating or diffusing liquid is fed to the central duct and flows radially in the outward direction, the liquid percolates through a mass of substance which has a gradually increasing cross sectional area so that its speed of circulation diminishes from the centre to the periphery. Experiments have shown that the time required for proper diffusion of very finely divided beet slices is substantially shorter than in usual diffusers. Besides, in a diffuser constructed and operating according to the invention, the mass of substance may be so finely divided as to have practically the consistency of a paste or mash and may undergo such a high degree of settling or compression that each hectoliter of the capacity of the diffuser will contain 102 kilograms of small beet slices. This means that the capacity of the diffuser is practically filled up completely with the substance to be osmotically or lixivially treated since the average specific gravity of sugar beets is 1.05.

The fraction of liquid which remains in the mass of exhausted substance, before the space or chamber between the perforated walls 2 and 12 is emptied, may be forced away by means of compressed air, steam or like fluid by feeding the said fluid into the duct 12a. Such fluid may be fed from a suitable piping (not shown) through the valve 20 which may be connected to said piping. Alternatively, the residual liquid may be drawn or sucked out by connecting the duct 12a to a source of depression or vacuum.

The time required for the passage of the liquid through the highly divided beet slices under treatment and the temperature of the liquid may be so determined as to extract the maximum quantity of saccharose and the minimum quantity of non-sugars. The pressure of the circulating and diffusing liquid which permits of the extraction of maximum saccharose, and the most efficient rate of speed for properly extracting the sugar from the slices must be regulated depending on the state of division of the slices, on their compression in the diffuser chamber between the two perforated ducts and on the thickness of the mass, that is to say the distance between the perforated walls 2 and 12.

While in the foregoing embodiment it has been assumed that the circulation of the diffusing liquid through the mass of substance under treatment takes place in the outward direction, such circulation might also take place in the inward direction. The axis of the diffuser may be arranged vertically, horizontally or obliquely to suit requirements. The diffuser may be fixed or may be removably mounted, for instance so as to be transported from one place to another. The diffuser may be arranged for rotary motion about its axis through any suitable drive.

The inner or central duct 12a may be either cylindrical as in the embodiment shown or, alternatively, it may have a flared shape or slightly conical shape or have a gradually increasing cross-sectional area from its inlet to its outlet, the latter being if required constricted, whereby a more uniform distribution of the liquid is ensured through the mass of divided substance under treatment.

A battery of diffusers constructed as above described may be installed above any suitable conveyor such for instance as an endless belt conveyor capable of receiving and taking away the successive batches of pulp discharged from the diffusers by rocking down their lower doors 10 after each treatment, the said conveyor taking the pulp to trucks or wagons. This permits to entirely do away with pulp pits and with the usual plant for separating and draining away the water from the pulp and also for drying and agglomerating said pulp and purifying the water.

The juice enriched by the material (e. g., saccharose) extracted from the substance under treatment (e. g., small beet slices) can flow either directly or through a propelling and/or heating device to the next diffuser in the battery.

The foregoing specification has referred to "slices" or "cossettes." It will be understood that the invention is applicable to the osmotic or lixivial treatment of materials or substances in other forms of sub-division and to materials other than sugar beet.

What is claimed is:

1. Stationary apparatus for the batch extraction of soluble substances from a comminuted mass of solid organic material containing them by horizontal radial flow of aqueous extracting liquid through the mass, which apparatus comprises a pair of substantially vertical perforated walls arranged to constitute a central duct for the admission of extracting liquid and an annular container adapted to be filled with the material to be extracted, a casing surrounding the outer perforated wall and spaced therefrom to form a collecting space for the extracting liquid after passing through the material to be extracted, doors for hermetically closing the top and bottom of the said annular container, a pipe for the admission of aqueous extracting liquid mounted on the bottom door of the container in register with the central duct and means adapted for filling the annular container with the extracting liquid and for passing a continuous current of the said extracting liquid radially through the material to be extracted.

2. Stationary apparatus for the batch extraction of soluble substances from a comminuted mass of solid organic material containing them by horizontal radial flow of aqueous extracting liquid through the mass, which apparatus comprises a pair of substantially vertical cylindrical walls of apertured sheet metal or metal gauze arranged to constitute a central duct and an annular container adapted to be filled with the material to be extracted, a cylindrical casing surrounding the outer perforated wall and spaced therefrom to form a collecting space for the extracting liquid after passsing through the material to be extracted, doors for hermetically closing the top and bottom of the said annular container, an inlet pipe for the aqueous extracting liquid mounted on the bottom door of the container in register with the central duct and means for passing the aqueous extracting liquid into the central duct and for forcing it radially from the central duct through the material in the annular container.

3. Stationary apparatus for the batch extraction of soluble substances from a comminuted mass of solid organic material containing them by horizontal radial flow of aqueous extracting liquid through the mass which apparatus comprises a pair of substantially vertical perforated walls arranged to constitute a central duct and an annular container adapted to be filled with the material to be extracted, radially extending vertical partitions dividing the said annular container into a plurality of compartments, a casing surrounding the outer perforated wall and spaced therefrom to form a collecting space for the extracting liquid after it has passed through the material to be extracted, doors for hermetically closing the top and bottom of the said annular container, an inlet pipe for the aqueous extracting liquid mounted on the bottom door of the container in register with the central duct and means adapted for filling the annular container with extracting liquid and for passing a continuous current of the extracting liquid radially through the material to be extracted.

4. Stationary apparatus for the batch extraction of soluble substances from a comminuted mass of solid organic material containing them by horizontal radial flow of aqueous extracting liquid through the mass which apparatus comprises a pair of substantially vertical perforated walls arranged to constitute a central duct and an annular container adapted to be filled with the material to be extracted, radial partitions extending throughout the height of the annular container and dividing the said annular container into a plurality of compartments, a casing surrounding the outer perforated wall and spaced therefrom to form a collecting space for the extracting liquid after it has passed through the material to be extracted, doors for hermetically closing the top and bottom of the said annular container, an inlet pipe for the aqueous extracting liquid mounted on the bottom door of the container in register with the central duct and means adapted for filling the annular container with extracting liquid and for passing a continuous current of the extracting liquid radially through the material to be extracted.

5. Stationary apparatus for the batch extraction of soluble substances from a comminuted mass of solid organic material containing them by horizontal radial flow of aqueous extracting liquid through the mass which apparatus comprises a pair of substantially vertical perforated metal walls arranged to constitute a central duct having a gradually increasing cross-sectional area from the bottom to the top thereof and an annular container adapted to be filled with the material to be extracted, a casing surrounding the outer perforated wall and spaced therefrom to form a collecting space for the extracting liquid after it has passed through the material to be extracted, doors for hermetically closing the top and bottom of the said annular container, a pipe for the admission of aqueous extracting liquid mounted on the bottom door of the container in register with the central duct and means for forcing aqueous extracting liquid into the central duct at its lower end and for collecting and removing the liquid from the space between the outer perforated wall and the outer casing after radial flow through the material to be extracted.

DARIO TEATINI.